(12) United States Patent
Szeto et al.

(10) Patent No.: US 7,363,295 B2
(45) Date of Patent: Apr. 22, 2008

(54) TECHNIQUES FOR INLINE SEARCHING IN AN INSTANT MESSENGER ENVIRONMENT

(75) Inventors: Christopher Szeto, Santa Clara, CA (US); Raymond Chung-Man Tam, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 473 days.

(21) Appl. No.: 10/827,910

(22) Filed: Apr. 19, 2004

(65) Prior Publication Data

US 2005/0234883 A1    Oct. 20, 2005

(51) Int. Cl.
  G06F 7/00    (2006.01)
  G06F 17/30   (2006.01)
(52) U.S. Cl. ............................ 707/3; 709/207; 709/227
(58) Field of Classification Search .................... 707/3; 709/207, 227
  See application file for complete search history.

(56) References Cited

U.S. PATENT DOCUMENTS

| | | | | |
|---|---|---|---|---|
| 5,764,916 | A | 6/1998 | Busey et al. | 395/200.57 |
| 6,430,602 | B1* | 8/2002 | Kay et al. | 709/206 |
| 6,584,464 | B1* | 6/2003 | Warthen | 707/4 |
| 6,781,608 | B1* | 8/2004 | Crawford | 715/758 |
| 2003/0079024 | A1* | 4/2003 | Hough et al. | 709/227 |
| 2003/0105819 | A1 | 6/2003 | Kim et al. | 709/205 |
| 2004/0122810 | A1* | 6/2004 | Mayer | 707/3 |
| 2004/0179039 | A1* | 9/2004 | Blattner et al. | 345/758 |
| 2004/0231003 | A1 | 11/2004 | Cooper et al. | 725/135 |
| 2005/0209002 | A1* | 9/2005 | Blythe et al. | 463/42 |
| 2007/0130126 | A1* | 6/2007 | Lucovsky et al. | 707/3 |

FOREIGN PATENT DOCUMENTS

| | | |
|---|---|---|
| WO | WO-01/13245 | 2/2001 |
| WO | WO-01/24036 | 4/2001 |

OTHER PUBLICATIONS

International Search Report mailed Oct. 26, 2005, for international patent application No. PCT/US2005/013426, filed Apr. 19, 2005, 5 pages.
"AOL Instant Messenger Service, User's Guide," N.A., Feb. 25, 1998.
"ICQ Pro Tour- Advanced Mode:Status Web Search," available from http://www.icq.com, ICQ, Dulles, VA (2003).
"ICQ features Catalog- Your ICQ Choices," available from http://www.icq.com, ICQ, Inc. Dulles, VA (2003).
BISHOP "You Got a Telegram. No its Instant Messaging," The Internet Times online column (2000).
Esenther "Instant Co-Browsing: Lightweight Real-time Collaborative Web Browsing," Conference Proceedings of The Eleventh International World Wide Web Conference( WWW2002) Waikiki, HI (May 2002).

* cited by examiner

*Primary Examiner*—Don Wong
*Assistant Examiner*—Marie Cabucos
(74) *Attorney, Agent, or Firm*—Morrison & Foerster LLP

(57) ABSTRACT

Techniques for performing inline searches in an instant messaging environment are provided. A user can implement a web search in an instant messaging window by entering a search query. A search query can be preceded by a predefined search trigger to identify the associated text as the search query. The search query is sent to an Internet search server, which processes the query and gathers search results. One or more of the search results is displayed inline in the instant messaging window to the sender and the recipient. The search result can be in XML or HTML format and can include graphics and hyperlinks.

17 Claims, 5 Drawing Sheets

TECHNIQUES FOR INLINE SEARCHING IN AN INSTANT MESSENGER ENVIRONMENT

BACKGROUND OF THE INVENTION

The present invention provides techniques for inline searching in an instant messaging environment, and more particularly, to techniques for performing a web search inline in an instant messaging environment and displaying search results inline in the instant messaging environment.

The Internet offers various ways for users to communicate with other users. For example, instant messaging (IM) provides communication between Internet users within a closed community. Only registered users can send or receive messages via an instant messaging service. Users are required to sign in to the same system (or possibly the same server) with a pre-selected user name and password before sending instant messages.

Often IM users have a desire to search the Internet to access information. For example, an IM user may want to search the Internet to locate information about a topic that is related to an active IM conversation. Current IM applications do not allow a user to link directly to the World Wide Web to perform searches, nor do they allow the user to easily share the search result.

An IM user must manually open a separate web browser window to link to the web site of an Internet search engine. After typing in search criteria into the Internet search web site, an IM user manually flips through the search results to identify relevant web sites and then links to those web sites. To share the search result, the user must copy and paste the URL for the web site into an IM conversation and send the URL.

Therefore, it would be desirable to provide techniques for performing web searches in an instant messaging environment.

BRIEF SUMMARY OF THE INVENTION

The present invention provides techniques for performing inline searches in an instant messaging environment. Specifically, a user can perform a web search inline in an instant messaging window. A user can simply enter a search query in the same fashion as typing in and sending an instant message. The user can also type in a predefined search trigger to identify the text as a search query.

In a preferred embodiment of the present invention, an instant messaging (IM) server issues a search request in response to receiving a search query preceded by a pre-defined search trigger. In another embodiment of the present invention, the instant messaging clients issue the search requests. The search request is sent to an Internet search server, which processes the request and generated search results. The search results are sent to both the sender and recipient for display inline in the instant messaging window.

A search result can be displayed in a standard format or in a shortcut format. The search result can be in XML or HTML format. The search result can include graphics and hyperlinks. The following detailed description together with the accompanying drawings will provide a better understanding of the nature and advantages of the present invention.

DETAILED DESCRIPTION OF THE INVENTION

Figure 1:
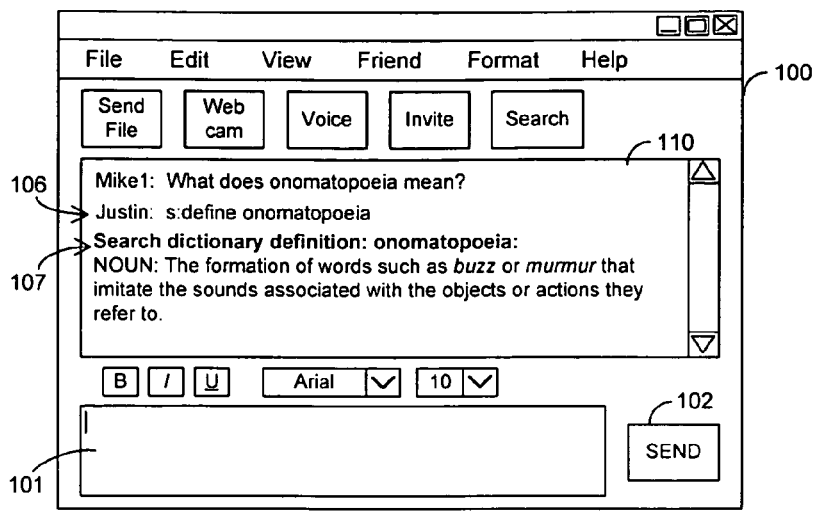
FIGS. 1-3 illustrates examples of instant messaging display windows that allow users to perform inline web searches according to the present invention.

FIG. 1 illustrates a window 100 displayed by an instant messaging (IM) software application that provides inline searching features of the present invention. Display window 100 shows an example of how a user in an instant messaging environment can perform inline web searches according to the present invention. A user can send an instant message to a friend by typing the message in region 101 and then selecting send option 102.

Instant messages sent to other users and instant messages received from other users are displayed in conversation region 110 of window 100. A user can make a request to perform a web search by entering a search trigger and a search query in region 101, and then selecting send option 102. A search trigger is a predefined character string that initiates a web search. The IM application recognizes a particular character string as a search trigger that indicates the user is attempting to initiate a web search. The search trigger typically precedes a search query.

For example, the user Justin has entered search request 106 "s:define onomatopoeia" in window 100. In this example, the characters "s:" define a search trigger. When a user enters "s:" followed by additional characters, the IM application recognizes that a search request is being made. The IM application treats the characters following "s:" as a search query.

In one embodiment, the instant messenger is configured such that it only recognizes the search trigger if it precedes all other characters that are entered in region 101 as part of an instant message. For example, an instant message "Did you know you can search by typing s:something?" is not treated as a search request, because the "s:" characters are preceded by other characters.

A search trigger can be any character string. The string "s:" is merely one example of a search trigger and is not intended to limit the scope of the present invention. Preferably, a search trigger is a character string that is not commonly entered by users during normal IM conversations, so that an IM user does not unintentionally enter the search trigger. Also, requiring that the search trigger be the first characters in an instant message helps to limit the instances in which a character string unintentionally triggers a search request.

In one embodiment of the present invention, when a user enters an instant message, the instant message is transmitted to an IM server. The IM server parses the instant message to determine if the message contains a search trigger. If a search trigger is located within the message, the IM server sends the search query to an Internet search server. In another embodiment, the IM client parses sent and received instant messages to determine if the message contains a search trigger. If a search trigger is located within the message, the IM client sends the search query to an Internet search server.

The Internet search server searches the Internet using the search query and returns a set of search results (e.g., web sites). The search results are returned to client or IM server in a data format, for example, as a piece of XML. The IM application formats one of the search results and displays the search inline in the conversation region 110 of an IM window. For example, in FIG. 1, an IM application displays search result 107, which provides the definition of the word onomatopoeia. Search result 107 can be obtained from a dictionary database or an Internet web page.

The IM application displays one of the search results identified by the search server. The search result is displayed to both IM users involved in the IM conversation occurring in conversation area 110.

The search requests and search results are formatted and displayed inline as shown in FIG. 1. Displaying a search request or a search result inline means that it is displayed in a line of an instant messaging window as if it were a regular instant message. Preferably, the inline display of the search result should not have any complex formatting. The search result can be displayed as a free form line of text and small images that can word wrap and fit into any message window of any width.

For example, search request 106 is displayed in a line of conversation region 110 in the same format as other instant messages. Also, search result 107 is display in 4 lines of region 110 in the same format as instant messages.

The inline searching features of the present invention allow users to perform web searches within an instant messaging window without opening another web browser window. Also, both the sender and recipient of the inline IM search query message can see the search results, creating a shared collaborative search experience in the IM window. Search requests can be entered in the same way instant messages are entered. Search requests and search results are formatted in the same format as instant messages and displayed inline in an instant messaging window.

Figure 2:
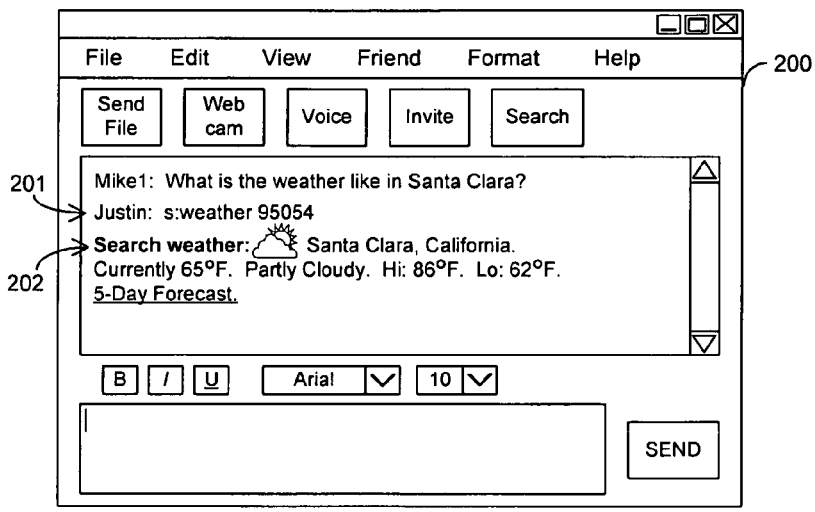

FIG. 2 illustrates a second example of a window 200 displayed by an instant messaging (IM) software application that provides inline searching features of the present invention. A user Justin has typed in search request 201 "s:weather 95054" inline in window 200. The string "s:" is recognized as a search trigger.

The search query "weather 95054" is transmitted to the Internet search server. The Internet search server returns one or more search results. One of these results is selected, formatted, and displayed inline in window 200. In FIG. 2, the search result 202 provides a text weather forecast for Santa, Clara Calif.

The search query can be transmitted to the search server by the IM server or the IM client. An advantage to doing the server-side implementation is that backward compatibility can be achieved more easily, and platform independence can be obtained easier. For example, the search can be performed and sent to mobile devices without the client on the mobile device having to update anything. Also, there are fewer requests hitting against the search server.

Inline search results of the present invention can include graphics and HTML in additional to plain text. For example, search result 202 also includes a graphic for partly cloudy and an HTML hyperlink to a 5-day forecast for Santa Clara, Calif.

Search results in an instant messaging environment can be displayed in numerous formats. According to one embodiment of the present invention, search results are displayed in a shortcut format. Search results 107 and 202 are examples of search results that are displayed in a shortcut format. Search results 107 and 202 have special formatting, images, and/or hyperlinks. A shortcut format is specific to a certain type of search. For example, search result data such as weather, definitions, stock quotes, etc. can be displayed in a particular way that is different and more useful than generic search results.

According to another embodiment of the present invention, the IM application displays a sponsored search result, if one is located. A sponsored search result is typically an advertiser's web site.

The search server sorts the search results according to their relevance to the search query terms. The first search result is the most relevant hit. The present invention can preferably display a sponsored search result. If the search server does not locate a sponsored search result, the first non-sponsor search result in the sorted list is displayed in the IM window. Sponsored search results are links to the web sites of particular entities. These entities pay a search provider to display their web site links.

Figure 3:
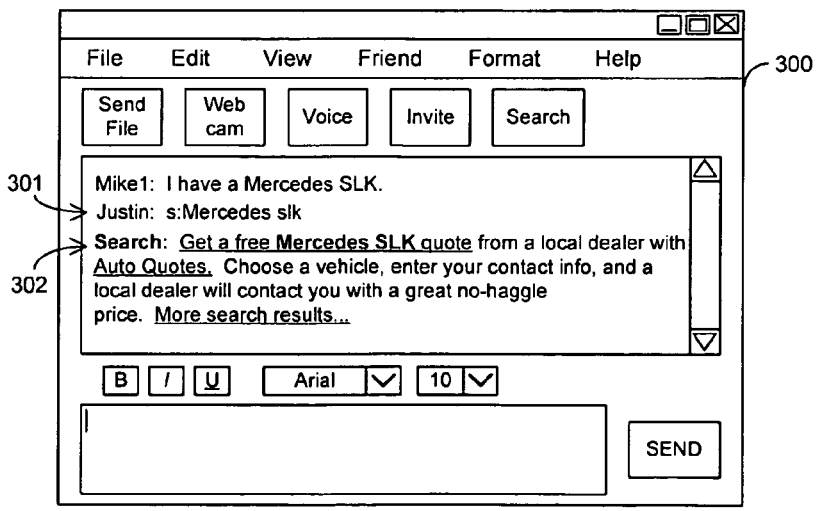

FIG. 3 illustrates an example of an inline display of a sponsored search result. User Justin enters search request 301 "s:Mercedes slk" into a line of IM window 300. The search result 302 is displayed in response to search request 301. Search result 302 is a sponsored search result accessed from a sponsor's web site. Search result 302 contains a hyperlink to the sponsor's web site.

Search result 302 also includes a "more search results" hyperlink. When the user clicks on the "more search results" link, the IM application opens a web browser to display the full list of search results. Alternatively, one or more additional search results can be displayed inline in the conversation region of IM window 300 when the user selects "more search results."

Figure 4:
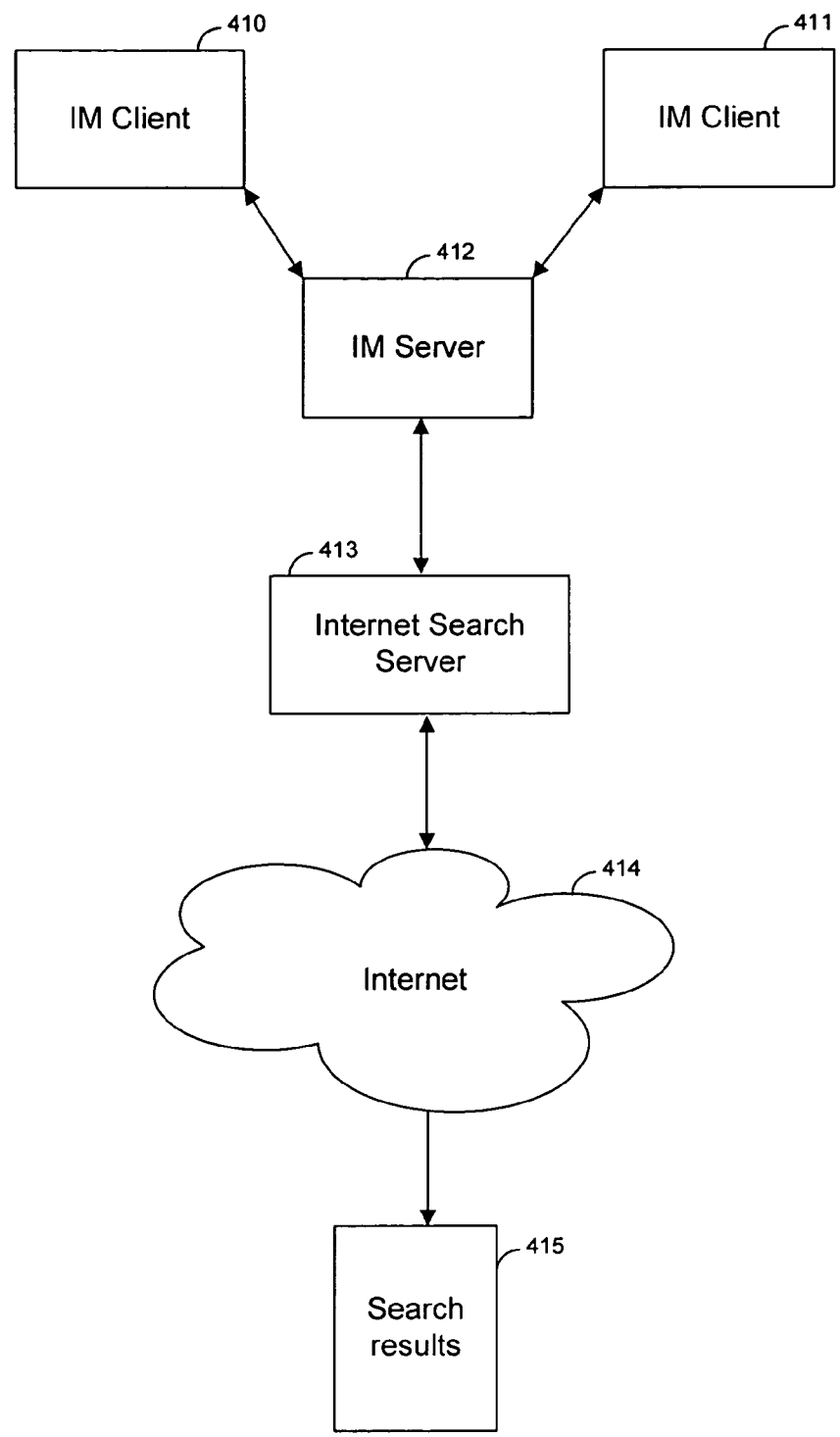
FIG. 4 is a diagram of a system that can implement inline IM searching features of the present invention.

FIG. 4 illustrates an example of a system that implements embodiments of the present invention. The system includes an instant messaging (IM) server 412 and instant messaging clients such as IM clients 410 and 411. Only two IM clients are shown in FIG. 4 for simplicity. However, server 412 can communicate with many more IM clients. An IM client launches an IM application to communicate with IM applications on other IM clients through IM server 412. IM server 412 transmits instant messages between the IM clients.

IM server 412 also communicates with Internet search server 413. Internet search server 413 can include any suitable Internet search technology such as Google's web searching technology. Internet search server 413 performs a search through the Internet 414 (e.g., World Wide Web) for information relating to the search query.

Internet search server 413 identifies one or more search results 415 that match the search query using web search technology. Internet search server 413 sorts the search results according to the relevance of the search results to the search query. Sponsor web sites can be given a higher ranking over non-sponsor web sites. One or more of the search results is selected and displayed to the IM users inline in the IM window, as shown in FIGS. 1-3.

Figure 5:
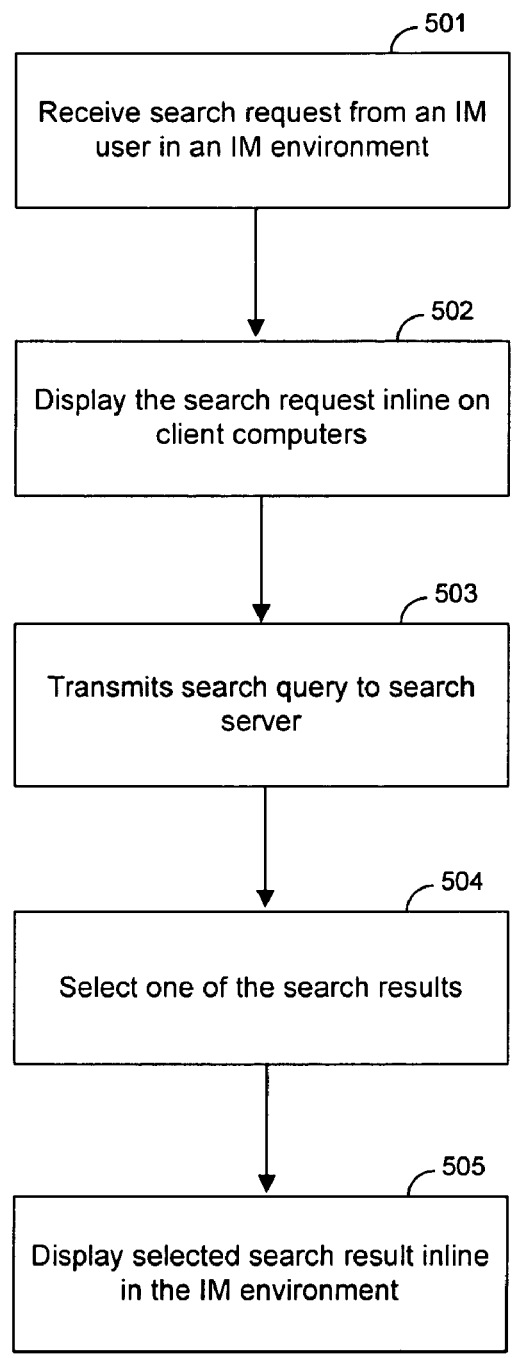
FIGS. 5-7 are flow charts that illustrate processes for requesting inline IM searches and displaying the results of inline IM searches according to various embodiments of the present invention.

FIG. 5 is a flow chart that outlines a process for requesting an inline IM search and displaying the search results according to an embodiment of the present invention. At step 501, a search request is received from an IM user in an IM environment. The search request includes a search query, and typically, a search trigger. At step 502, the search request is displayed inline in an instant messaging window on client computers.

At step 503, the search query is transmitted to a search server. The search server performs a search of the web using the search query and retrieves search results. At step 504, one or more of the search results is selected. At step 505, the selected search results are displayed inline in the instant messaging windows on the client computers.

Figure 6:
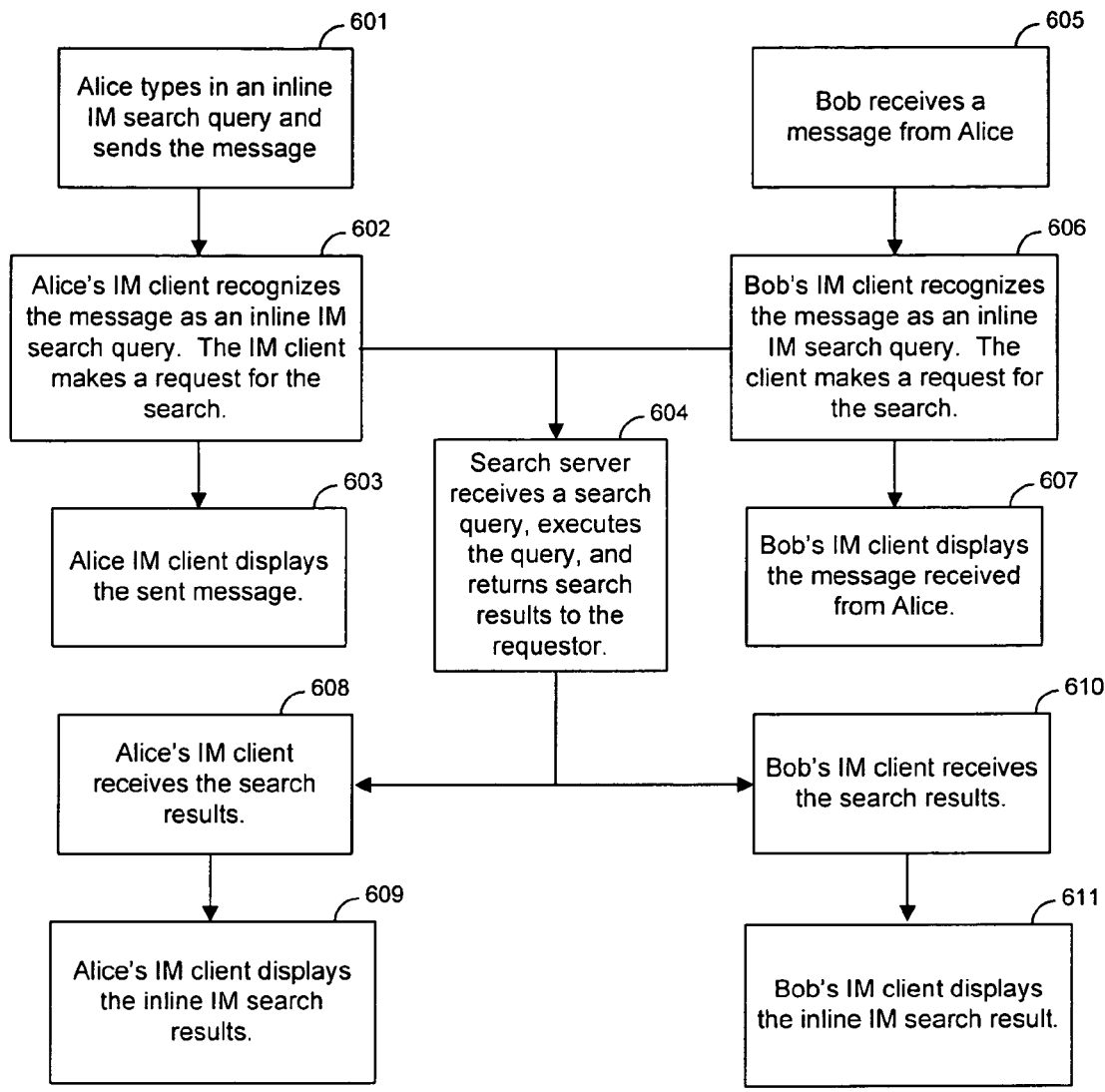

FIG. 6 is a flow chart that illustrates another process for requesting inline IM searches and displaying the search results according to another embodiment of the present invention. At step 601, a first user (e.g., Alice) types in an inline IM search query in an IM window and sends the search query as a message. At step 602, Alice's IM client application recognizes the message as including an inline IM search query (e.g., by identifying a search trigger in the message). The IM client then makes a request for the search and transmits the search query to a search server. At step 603, Alice's IM client displays Alice's message in the conversation area of the IM window. At step 604, a search server receives the search query, executes the query, and returns the search results to the requestor.

At step 605, a second IM client (e.g., Bob's IM client) receives Alice's message. At step 606, the IM client application on Bob's IM client computer recognizes Alice's message as including an inline IM search query. Upon recognizing the message as a search query, Bob's IM client makes a request for the search. At step 604, the search server receives and executes the query, and then returns the search results.

At step 608, Alice's IM client receives the search results from the search server. At step 609, Alice's IM client displays one or more of the inline IM search results in the IM window. At step 610, Bob's IM client receives the search results from the search server. At step 611, Bob's IM client displays one or more of the inline IM search results in the IM window.

Figure 7:
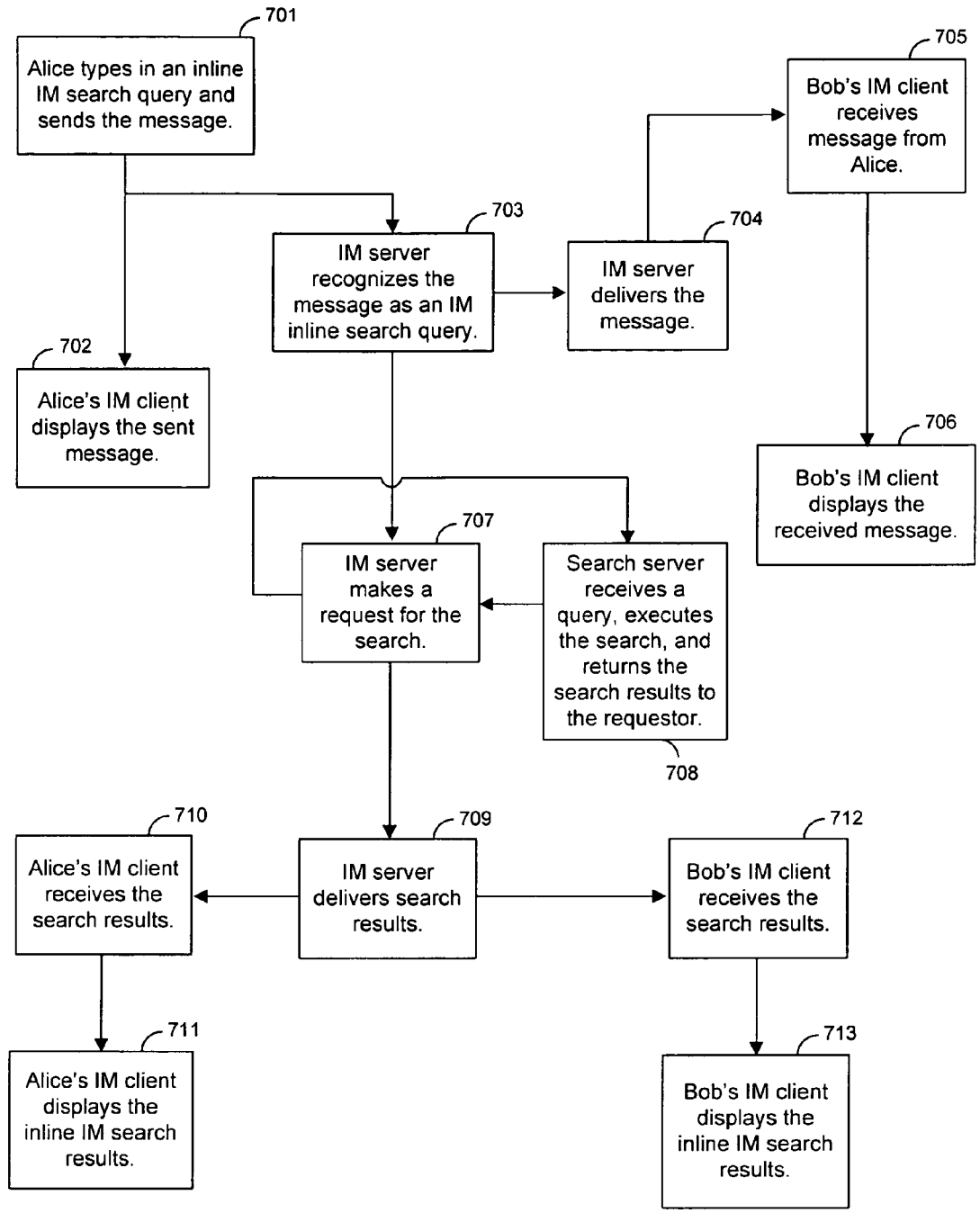

FIG. 7 is a flow chart that illustrates another process for requesting inline IM searches and displaying the search results according to yet another embodiment of the present invention. At step 701, a first user (Alice) types in an inline search query into an IM application window and sends the query as a message. At step 702, Alice's IM client application displays the message sent by Alice. At step 703, an IM server recognizes the message as an IM inline search query. At step 704, the IM server deliver the message to the recipient IM client.

At step 705, the recipient IM client application receives the message sent from the Alice's IM application. Bob is the second user on the recipient IM application. At step 706, Bob's IM client application displays the message received from Alice inline in an IM window.

At step 707, the IM server makes a request for the search and transmits the query to a search server. At step 708, the search server receives the search query, executes the search, and returns the search results to the requestor. The IM server receives the search results from the search server.

At step 709, the IM server delivers the search results to the two IM clients. At step 710, Alice's IM client receives the search results. At step 711, Alice's IM client displays one or more of the inline IM search results in the IM window. At step 712, Bob's IM client receives the search results. At step 712, Bob's IM client displays one or more of the inline IM search results in the IM window.

While the invention has been described with respect to specific embodiments, one skilled in the art will recognize that numerous modifications are possible. The various components of an instant messaging system may be implemented using hardware components, programmable devices (e.g., microprocessors) executing software instructions, and any combination thereof. "Instant messaging" as used herein is not limited to any particular protocol, format, delivery method, or form factor and includes messages delivered according to any protocol that enables communication among a closed community of authenticated users. Thus, although the invention has been described with respect to specific embodiments, it will be appreciated that the invention is intended to cover all modifications and equivalents within the scope of the following claims.

What is claimed is:

1. A method for searching the Internet in an instant messaging environment, the method comprising:
   recognizing at least a portion of an instant message, from a first user to a second user and entered into an instant messaging application on a first client computer, as a search query, wherein recognizing the instant message entered by the first user as a search query comprises identifying a character string in the instant message as a search trigger;
   causing the search query to be displayed inline in an instant messaging window on the first client computer and in a second instant messaging window on a second client computer;
   causing a web search based on the search query in response to identifying the search trigger in the instant message, the web search retrieving search results; and
   causing at least one of the search results to be displayed inline in the instant messaging window on the first client computer and inline in the second instant messaging window on the second client computer.

2. The method according to claim 1 wherein the search result includes an image.

3. The method according to claim 1 wherein the search result includes a hyperlink to a web page.

4. The method according to claim 1 wherein displaying the at least one search result further comprises:
   selecting one of the search results retrieved in the web search that is most relevant to the search query based on a predetermined algorithm, and displaying the selected search result.

5. The method according to claim 1 wherein displaying the at least one search result further comprises: selecting a link to a sponsor web site from among the search results retrieved in the web search, and displaying the selected search result.

6. A computer system for facilitating searching the Internet in an instant messaging environment, the computer system comprising:
   an instant messaging (IM) server for:
      receiving an instant message from a first instant messaging (IM) client to a second instant messaging client, wherein the instant message includes a search query;
      recognizing the instant message as including a search query by identifying a search trigger in the instant message;
      communicating the search query received from the first IM client to the second IM client for display inline in a second instant messaging window on the second IM client, and
      causing a search based on the search query in response to identifying the search trigger in the instant message, the search returning search results, wherein at least one of the search results is transmitted to the first IM client for display inline in the first instant messaging window, and to the second IM client for display inline in the second instant messaging window.

7. The computer system according to claim 6 wherein the IM server selects a sponsor web site from among the search results and transmits the selected search result to the first and the second client computers.

8. The computer system according to claim 6 wherein the at least one search result includes an image.

9. The computer system according to claim 6 wherein the at least one search result includes a hyperlink.

10. The computer system according to claim 6 wherein the IM server receives the search query from the first IM client, transmits the search query to a search server, and delivers the at least one search result to the first and the second IM clients.

11. The computer system according to claim 6 wherein the first IM client transmits the search query to a search server, and receives the at least one search result directly from the search server.

12. The computer system according to claim 6 wherein the second IM client transmits the search query to a search server, and receives the at least one search result directly from the search server.

13. A computer-readable medium encoded with instructions for performing a method for causing web searches in an instant messaging environment, the method comprising:
   recognizing that an instant message entered by a first user into a first instant messaging application on a first client computer includes a search query, the instant message to a second user on a second client, wherein recognizing that the instant message entered by the first user includes a search query comprises identifying a character string in the instant message as a search trigger;
   displaying the search query inline in a first instant messaging window on the first client computer and inline in a second instant messaging window on the second client;
   transmitting the search query to a search server in response to identifying the search trigger, wherein the search server performs a search based on the search query and returns search results; and
   displaying one or more of the search results inline in the first instant messaging window on the first client computer and inline in the second instant messaging window on the second client.

14. The computer readable medium according to claim 13 wherein transmitting the search query to the search server further comprises an instant messaging server receiving the search query and transmitting the search query to the search server.

15. The computer readable medium according to claim 13 wherein transmitting the search query to the search server further comprises the first client computer transmitting the search query to the search server.

16. The computer readable medium according to claim 13 wherein the method further comprises: selecting a sponsor web site from among the search results, wherein the sponsor web site is displayed inline in the first instant messaging window.

17. Apparatus for facilitating searching in an instant messaging environment, the apparatus comprising:
   logic for identifying a search query in an instant message from a first user of a first instant messaging (IM) client to a second user of a second instant messaging (IM) client, wherein the logic for identifying the search query in the instant message is based on a search trigger within the instant message;
   logic for causing a search based on the search query in response to identifying the search trigger, the search resulting in at least one search result; and
   logic for causing at least one of the search results to be displayed inline in a first window of the first IM client and in a second window of the second IM client.

* * * * *